(12) United States Patent
Lavery et al.

(10) Patent No.: US 8,336,043 B2
(45) Date of Patent: Dec. 18, 2012

(54) DYNAMIC DEPLOYMENT OF CUSTOM CODE

(75) Inventors: Darryn O. Lavery, Seattle, WA (US); Adriaan W. Canter, Seattle, WA (US); Sameer V. Bhangar, Seattle, WA (US); Thomas E. Quinn, Seattle, WA (US); Justin Kwak, Redmond, WA (US); Jeff Young, Snoqualmie, WA (US); Brent Rector, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1658 days.

(21) Appl. No.: 11/675,591

(22) Filed: Feb. 15, 2007

(65) Prior Publication Data

US 2008/0201707 A1    Aug. 21, 2008

(51) Int. Cl.
G06F 9/445 (2006.01)
(52) U.S. Cl. ........................... 717/173; 717/178
(58) Field of Classification Search ................ 717/169, 717/172, 173, 175, 178
See application file for complete search history.

(56) References Cited

U.S. PATENT DOCUMENTS

| | | | |
|---|---|---|---|
| 5,797,015 | A | 8/1998 | Daniels, Jr. et al. |
| 5,916,308 | A | 6/1999 | Duncan et al. |
| 6,347,398 | B1 * | 2/2002 | Parthasarathy et al. ....... 717/178 |
| 6,976,037 | B1 | 12/2005 | D'Souza et al. |
| 2004/0128400 | A1 | 7/2004 | Srinivasan et al. |
| 2004/0268301 | A1 | 12/2004 | Kaston |
| 2005/0160104 | A1 | 7/2005 | Meera et al. |
| 2005/0160414 | A1 | 7/2005 | Parnanen et al. |
| 2005/0262480 | A1 | 11/2005 | Pik et al. |
| 2006/0036993 | A1 | 2/2006 | Buehler et al. |
| 2006/0080468 | A1 | 4/2006 | Vadlamani et al. |
| 2006/0136344 | A1 | 6/2006 | Jones et al. |
| 2006/0155672 | A1 | 7/2006 | Lee et al. |

OTHER PUBLICATIONS

Campbell, S., et al., Introducing Microsoft® VisualBasic 2005 for Developers, Microsoft Press (2005).*
Byrd, P., Day 1: Introduction to Managed Code and the .NET Infrastructure, Toolbox for IT (2005).*
"'Click Once' to Managed Code?," Microsoft Monitor Weblog, Oct. 29, 2003, A Jupiter Research Business Weblog, http://www.microsoftmonitor.com/archives/001774.html.
"System.Deployment.Application Namespace," © 2006 Microsoft Corporation, http://msdn2.microsoft.com/en-us/library/system.deployment.application(d=printer).aspx, [last accessed Nov. 15, 2006].
Bamford, Roger et al., "A Scalable and Highly Available Networked Database Architecture," Proceedings of the 25th VLDB Conference, Edinburgh, Scotland, 1999, pp. 199-201.
Carmo, Joao Leonardo et al., "Using Visual Studio Extensibility Mechanisms for Requirements Specification," 2005, International Conference on Innovative Views of the .Net Technology, pp. 45-57.
Jai, Benchiao, "A Lightweight Dynamic OOP Framework for Automatic Application Location, Installation and Upgrade," 1998, http://scholar.google.com/scholar?hl=en&lr=&q=cache:WWQcfgl4yFwJ:www.bell-labs.com/user/benjai/OOPSLA98.pdf+application+installation+add+ins, [last accessed Sep. 13, 2006].
Noyes, Brian, "Deploy and Update Your Smart Client Projects Using a Central Server," MSDN Magazine, May 2004, http://msdn.microsoft.com/msdnmag/issues/04/05/ClickOnce/default.aspx.

* cited by examiner

Primary Examiner — Anna Deng
(74) Attorney, Agent, or Firm — Perkins Coie LLP

(57) ABSTRACT

A method and system for dynamically downloading custom code for execution within a host application is provided. A deployment system augments the manifest used for deploying managed applications to include information describing how the host application is to use the custom code, referred to as host manifest information. The deployment system reports the progress of the downloading of the manifest and the custom code to the host application. The host application can then perform appropriate host-specific processing. The host application may provide to the deployment system an interface for verifying the trust of the custom code. The deployment system also allows the host application to control the uninstalling of the custom code.

19 Claims, 7 Drawing Sheets

DYNAMIC DEPLOYMENT OF CUSTOM CODE

BACKGROUND

The deployment of software within an organization has traditionally been an expensive and time-consuming process. For example, an organization that wants to install an application program on each of its computer systems may need to have a technician go to each computer system and manually control the installation of the application program. To help reduce the expense and time of deploying application programs, an administrator of an organization may use a system management service to control the deployment. A system management service helps automate the installation of the application programs on the computer systems of the organization. The system management service could distribute and install various application programs on the desired computer systems. After an application program is installed on desired computer systems of the organization, the users of those computer systems can start to use the application program. Although system management services have achieved their goal of reducing expense and time, such static deployment of application programs has some disadvantages. First, even though the software may be installed on a certain computer system, the user may never use that application program. As a result, the installed application program is unnecessarily consuming resources (e.g., disk space) of the computer system. Second, a user who wants to use the application program may not have it installed on their computer system because it was not designated as a desired computer system during deployment. In such a case, an administrator may need to manually control the installation of the application program on that user's computer system.

Many application programs are developed to be "managed" applications that execute within the .NET Framework provided by Microsoft Corporation. The .NET Framework provides a common language runtime ("CLR") that provides high-level operating system type services to the managed applications and serves as an execution engine for managed applications. The CLR ensures that managed applications do not take any unauthorized action. As such, the CLR acts as a "sandbox" within which managed applications execute. The CLR provides application domains ("appdomains") in which different application programs can execute to help ensure that an errant application will not unduly affect the execution of another application program.

Dynamic deployment of managed applications has been developed to help overcome the disadvantages of static deployment of application programs. With dynamic deployment, a managed application can be dynamically downloaded and installed within the .NET Framework of a computer system as needed. Microsoft's ClickOnce deployment technology provides such dynamic deployment of managed applications. Dynamic deployment allows a hosting program executing on a computer system to dynamically deploy a managed application to that computer system. As an initial step, a managed application that is to be dynamically deployed needs its application manifest (or an assembly manifest) published to a deployment server. (The application manifest may be identified in a deployment manifest that also identifies the version of the custom code identified by the application manifest.) The application manifest specifies the location of the components of the managed application (e.g., on a server other than the deployment server), identifies the provider of the managed application, and provides security requirements needed to execute the managed application. The hosting program is then provided with the identifier (e.g., URL) of the application manifest. To deploy the application program, the hosting program uses the manifest identifier to retrieve the manifest from the deployment server. The hosting program can then download the components specified in the manifest, install the managed application within the .NET Framework, and start the execution of the managed application in an appdomain that is separate from the appdomain of the hosting program. To help the hosting program with deploying managed applications, the ClickOnce deployment technology provides an in place hosting manager class ("IPHM"). The hosting program instantiates an in place hosting manager object and requests the object to install the managed application specified by the application manifest. The in place hosting manager object may help ensure that the managed application can be trusted (e.g., by comparing the provider to lists of trusted or untrusted providers). The in place hosting manager object may also ensure that the managed application executes with the security level specified in the application manifest. The in place hosting manager object may cache the downloaded managed application so that it can subsequently load the managed application without having to download it again from a server. As needed, the in place hosting manager object will automatically remove managed applications from the cache. The in place hosting manager object may also ensure that the most recent version of a managed application is loaded.

Many application programs, both managed and unmanaged, allow custom code (e.g., addins and document-level customizations) to be provided by third parties. Such application programs expose functionality that can be used by the custom code. The custom code may improve the usability of the application programs or provide additional functionality (e.g., domain-specific functionality). Custom code logically executes in the same process space or appdomain as the application program, rather than as an executable application. Because of the ease of developing custom code as managed code, many application programs support the execution of custom code in the NET Framework. The custom code may be stored as a dynamic link library, which can be loaded into the appdomain of the application program. There is, however, no mechanism for dynamically deploying custom code from network servers to computer systems.

SUMMARY

A method and system for dynamically downloading custom code for execution within a host application is provided. The deployment system is developed by adapting an existing deployment system for deploying managed applications to also deploy custom code. To support the deployment of custom code, the deployment system augments the manifest used for deploying managed applications to include information describing how the host application is to use the custom code, referred to as host manifest information. The deployment system provides the host manifest information to the host application (or other code that requests the download). The deployment system also reports the progress of the downloading of the manifest and the custom code to the host application. The host application can then perform appropriate host-specific processing. The host application may provide to the deployment system an interface for verifying the trust of the custom code. Thus, the verification of the trust of the custom code can be host-specific. The deployment system also allows the host application to control the uninstalling of the custom code.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for dynamically downloading custom code for execution within a host application is provided. In one embodiment, the deployment system is developed by adapting an existing deployment system for deploying managed applications to also deploy custom code. To support the deployment of custom code, the deployment system augments the application manifest used for deploying managed applications to include information describing how the host application is to use the custom code, referred to as host manifest information. The host manifest information may describe various entry points into the custom code and may include host-specific information such as the names of the host application that can execute the custom code. Such host-specific information can be used by a host application, for example, to ensure that only custom code specifically developed for that host application is executed by the host application. The deployment system provides the host manifest information to the host application. The deployment system also reports the progress of the downloading of the manifest and the custom code to the host application. The host application can then perform appropriate host-specific processing. For example, a host application may display a dialog box indicating the progress of the download of the manifest and the custom code or may update registry entries. The deployment system may verify the trust of the custom code by invoking functionality provided by the host application. The host application may provide to the deployment system an interface for verifying the trust of the custom code. Thus, the verification of the trust of custom code can be host-specific. The deployment system also allows the host application to control the uninstalling of the custom code. In one embodiment, the deployment system may be adapted to deploy both managed applications and custom code that is implemented as managed code. In such an embodiment, the deployment system may distinguish between a managed application and custom code that is to be deployed based on the presence of host manifest information in the manifest. The deployment system may be adapted to provide the host manifest information to the host application when custom code is being downloaded. The deployment system may be adapted to automatically verify the trust of managed applications but rely on the host application to verify the trust of custom code. The deployment system may also automatically uninstall managed applications (remove them from its cache) but rely on the host application to uninstall custom code. In this way, the deployment system allows custom code that is not an executable to be dynamically deployed to computer systems as requested by host applications.

Figure 1:
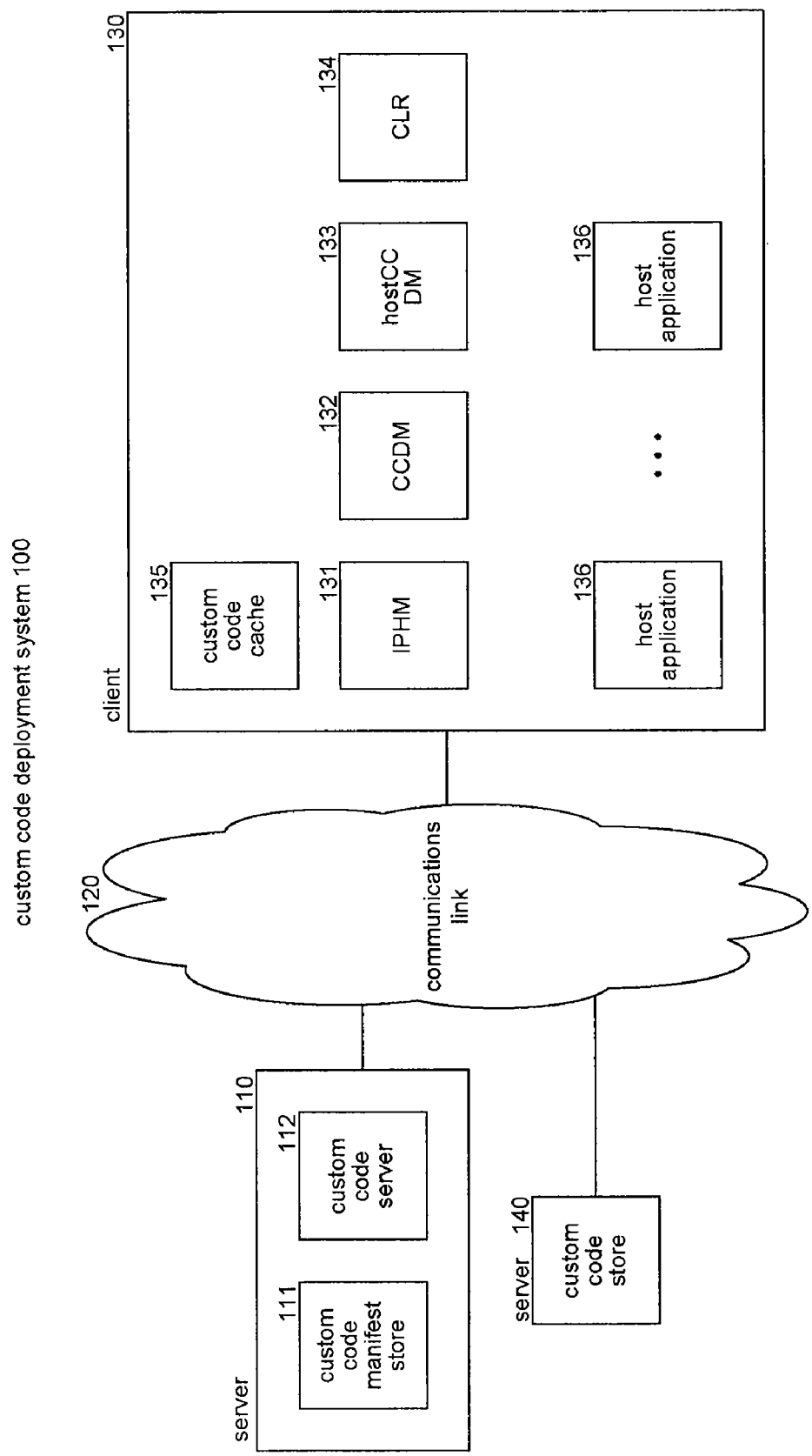
FIG. 1 is a block diagram that illustrates components of a custom code deployment system in one embodiment.

FIG. 1 is a block diagram that illustrates components of a custom code deployment system in one embodiment. The custom code deployment system 100 includes a server component 110 and a client component 130 connected via a communications link 120. The server component executes on a server computer system and includes a custom code manifest store 111 and a custom code manifest server component 112. The custom code manifest store contains the manifests of the custom code that has been published to the deployment system. The custom code manifest server component receives requests to publish custom code and requests for manifests of the published custom code. Upon receiving a request for a manifest, the custom code manifest server component retrieves the manifest from the custom code manifest store and provides the retrieved manifest to the client component of the requesting computer system. The manifest identifies the location where the custom code is stored, such as in a custom code store at server 140. The client component of the deployment system includes an in place hosting manager component ("IPHM") 131, a custom code deployment manager component ("CCDM") 132, a host custom code deployment manager component ("hostCCDM") 133, a common language runtime component ("CLR") 134, a custom code cache 135, and host applications 136. These components are described in detail with reference to FIGS. 2 and 3.

The computing devices on which the deployment system may be implemented may include a central processing unit, memory, input devices (e.g., keyboard and pointing devices), output devices (e.g., display devices), and storage devices (e.g., disk drives). The memory and storage devices are computer-readable media that may be embedded with computer-executable instructions that implement the deployment system. In addition, the instructions, data structures, and message structures may be stored or transmitted via a data transmission medium, such as a signal on a communications link. Various communications links may be used, such as the Internet, a local area network, a wide area network, or a point-to-point dial-up connection.

The deployment system may be implemented on various computing systems or devices including personal computers, server computers, multiprocessor systems, microprocessor-based systems, network PCs, minicomputers, mainframe computers, distributed computing environments that include any of the above systems or devices, and the like. The deployment system may be used by various computing systems such as personal computers, cell phones, personal digital assistants, consumer electronics, home automation devices, and so on.

The deployment system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the manifests and the custom code may be stored on the same server or on different servers.

Figure 2:
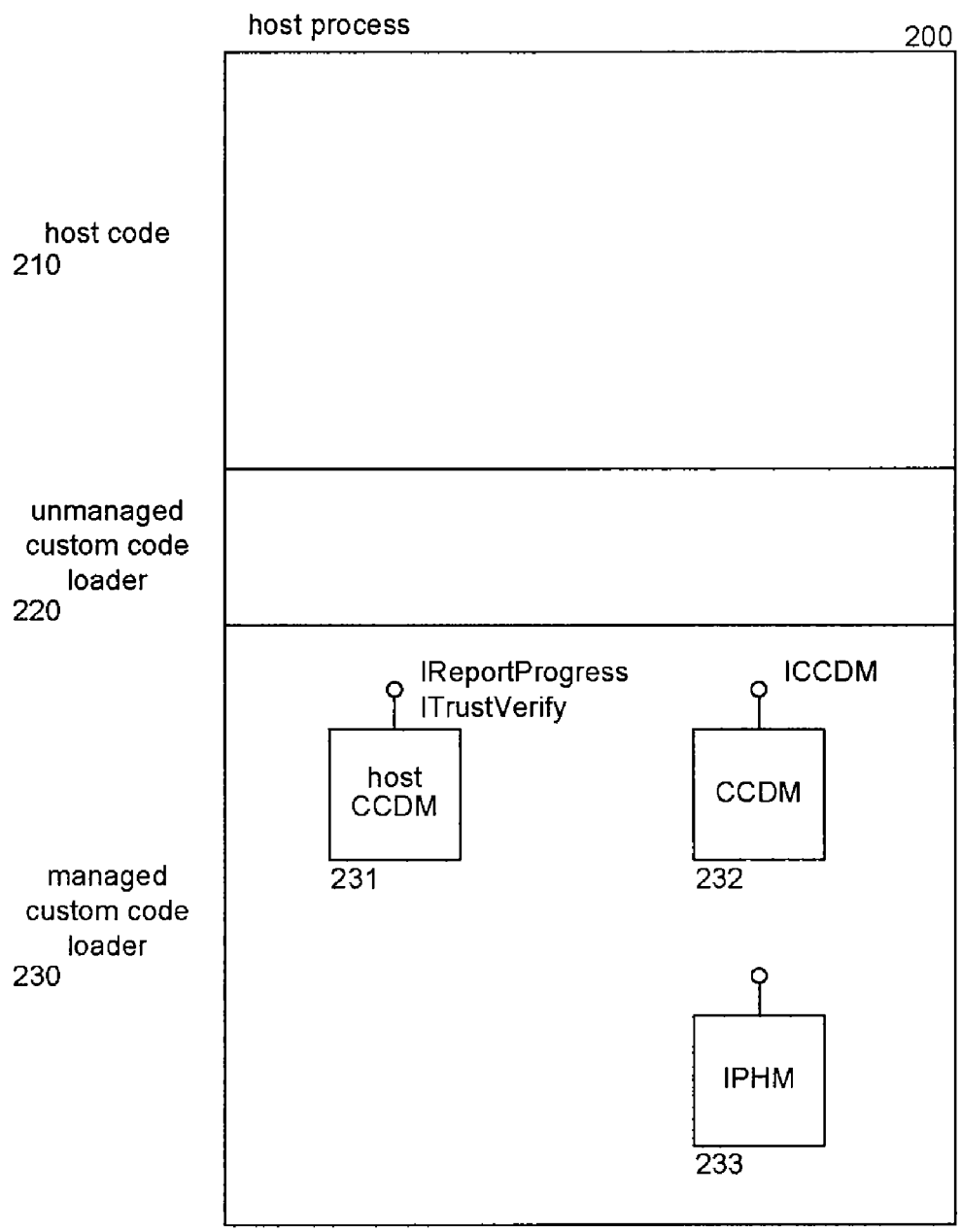
FIG. 2 is a block diagram that illustrates use of the deployment system by a host application that is not modified to accommodate the dynamic deployment of custom code in one embodiment.

FIG. 2 is a block diagram that illustrates use of the deployment system by a host application that is not modified to accommodate the dynamic deployment of custom code in one embodiment. The host application is developed to invoke a loader that is responsible for loading the custom code. In such a case, the deployment system can be implemented by the loader without modification to the code of the host application. In this example, the host application executes as a host process 200 that includes host code 210 executing as unmanaged code, and an unmanaged custom code loader component 220 executing as unmanaged code, and a managed custom code loader component 230 executing as managed code. When the host application wants to load custom code, the host application invokes the unmanaged custom code loader component, passing the identification of the manifest of the custom code to be loaded. The unmanaged custom code loader component starts the CLR (not shown) within the host process and invokes the managed custom code loader component, passing the manifest identifier. The managed custom code loader component then instantiates a host custom code deployment manager object (hostCCDM) 231. The host custom code deployment manager object (hostCCDM) provides an implementation of a verify trust interface that provides methods for verifying the trust of custom code and a report progress interface that provides methods for receiving notifications of the progress of the downloading of a manifest and custom code. The host custom code deployment manager object (hostCCDM) may be alternatively implemented as two objects: one for the verify trust interface and the other for the report progress interface. The implementation of the host custom code deployment manager object (hostCCDM) allows for processing that is specific to the host application or at least specific to the managed custom code loader. For example, when progress on the installation is reported, the implementation of the report progress interface may display a progress bar or add registry entries for the custom code. The managed custom code loader component then instantiates a custom code deployment manager object (CCDM) 232. The custom code deployment manager object (CCDM) provides methods for installing and uninstalling custom code. When the custom code deployment manager object (CCDM) is instantiated, it is provided with the verify trust and the report progress interfaces along with the manifest identifier. The managed custom code loader component then invokes the install method of the custom code deployment manager object (CCDM).

When the install method is invoked, the custom code deployment manager object (CCDM) instantiates an in place hosting manager object 233, passing the manifest identifier of the custom code to be downloaded. The in place hosting manager object provides methods for downloading the manifest and the custom code and reports progress of the download to the custom code deployment manager object (CCDM) via events. The custom code deployment manager object (CCDM), upon receiving an event, invokes a method of the report progress interface to notify the host custom code deployment manager object (hostCCDM) to pass the notification to the host application (or more generally to notify the invoking code). The custom code deployment manager object (CCDM) invokes a get manifest method of the in place hosting manager object to download the manifest of the custom code. The get manifest method returns the manifest including the host manifest information using events through which it reports progress of the download. The custom code deployment manager object (CCDM) then verifies the signature of the manifest and invokes the verify trust interface provided when it was instantiated to allow the host application to verify the trust of the manifest. Assuming the signature is verified and the host application verifies the trust, the custom code deployment manager object (CCDM) invokes the download application method of the in place hosting manager object to download the application identified by the manifest. The download application method reports progress of the download of the application to the custom code deployment manager object (CCDM) via events. The custom code deployment manager object (CCDM) then notifies the host custom code deployment manager object (hostCCDM) of the progress via the report progress interface. The custom code deployment manager object (CCDM) is notified of completion of the download by an event, notifies the host custom code deployment manager object (hostCCDM) via the report progress interface, and causes return to the host application. The host application can then start the execution of the custom code.

Figure 3:
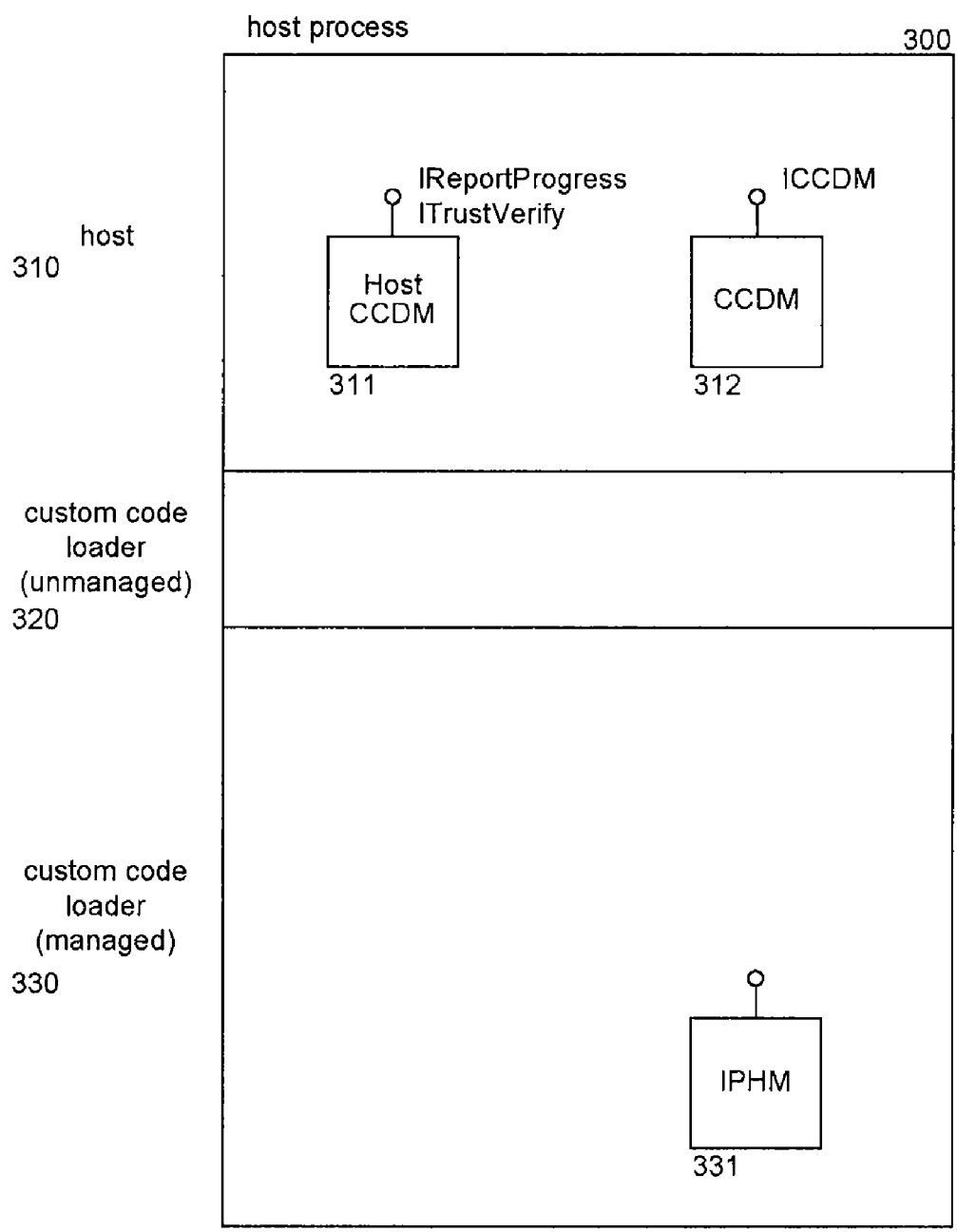
FIG. 3 is a block diagram that illustrates use of the deployment system by a host application that is modified to accommodate the dynamic deployment of custom code in one embodiment.

FIG. 3 is a block diagram that illustrates use of the deployment system by a host application that is modified to accommodate the dynamic deployment of custom code in one embodiment. Because the host application is modified, the host-specific processing can be tailored to the host application, rather than simply to a custom code loader that may be shared by different host applications. The host application executes as a host process 300 that includes host code 310 executing as unmanaged code, a custom code loader component 320 executing as unmanaged code, and a custom code loader component 330 executing as managed code. In an alternate embodiment, the host code may execute as managed code. When the host application wants to load custom code, the host application instantiates a host custom code deployment manager object (hostCCDM) 311, which provides the behavior described with reference to FIG. 2. The host application then instantiates a custom code deployment manager object (CCDM) 312, which provides the behavior described with reference to FIG. 2. The host application then invokes the install method of the custom code deployment manager object (CCDM). The custom code deployment manager object (CCDM) invokes the unmanaged custom code loader, which starts the CLR and invokes the managed custom code loader component. The managed custom code loader component instantiates the in place hosting manager object 331, which provides the behavior described with reference to FIG. 2. The custom code deployment manager object (CCDM) then uses the in place hosting manager object to download the custom code as described with reference to FIG. 2.

The following tables illustrate sample methods and events of various classes of the deployment system.

TABLE 1

| IPHM | Methods | DownloadApplicationAsync |
| | | GetManifestAsync |
| | | UninstallCustomCode |
| | Events | DownloadApplicationCompleted |
| | | DownloadProgressChanged |
| | | GetManifestCompleted |

The IPHM class of Table 1 may be an implementation of the Windows InPlaceHostingManager ("IPHM") that supports the dynamic download and installation of a managed application that has been extended to support the download and installation of custom code. The GetManifestAsync method downloads the manifest and returns it to the invoking code asynchronously and raises a GetManifestCompleted event when the operation has either completed or encountered an error. The DownloadApplicationAsync method downloads an application or custom code asynchronously and raises a DownloadProgressChanged event to report the progress of a download and a DownloadApplicationCompleted event when the download has either completed or encountered an error. The UninstallCustomCode method is called to uninstall the custom code from the download cache.

TABLE 2

| CCDM | Methods | CCDM (manifestURI, ItrustManager)<br>CCDM (manifestURI, ItrustManager, IReportProgress)<br>InstallCC( ): CCInformation<br>UninstallCC( ): Void |
|---|---|---|

The CCDM class of Table 2 provides services needed by a host application to download and install custom code. These services include downloading the custom code, verifying certificate signatures, and uninstalling. The class uses the manifestURI to locate the manifest for the custom code. The class uses a VerifyCCTrust method of the ITrustManager interface for performing host-specific verification of trust. The VerifyCCTrust method is passed evidence (e.g., final manifest location, original manifest location, product name, and signature result) to determine whether the custom code can be trusted. The class implements a call-back model using the IReportProgress interface to notify the host application of the progress in installing the custom code. The class invokes the methods of the IReportProgress interface to report various events that may include Downloaded, Installed, Installing, ManifestDownloaded, Uninstalled, and so on. The host application can take appropriate actions based on the progress. For example, addins for one application may require registry keys to be created, and addins for another type of application may require form regions to be registered. These host-specific actions are designed to be implemented in the host custom code deployment manager for the application (i.e., HostCCDM class). The CCInformation class contains information needed to start the execution of the custom code. The custom code loader may need an AppDomainSetup object and the host-specific application manifest (with entry point information).

TABLE 3

| HostCCDM | Methods | HostCCDM(manifestFullLocationPath, manifestName)<br>HostCCDM(manifestURI)<br>VerifyCCTrust(evidence)<br>OnCC{Event} (e.g., "Event" includes Downloaded, Installed, Installing, ManifestsDownloaded, Uninstalled) |
|---|---|---|

The HostCCDM class of Table 3 allows the custom code loader to identify the manifest of the custom code to be loaded, verify the trust of the custom code, and receive notifications of various events. The class may provide host-specific behavior. For example, the constructors for the class may check an exclusion list, an inclusion list, and an untrusted sites list. As another example, when a HostCCDM object receives a notification of an event, it can add entries to the system registry. The constructors for this class may identify the location of the manifest using either a URI or a manifest path name. A document-level customization may provide the URI of the manifest, and an application addin may provide the manifest path name of a registry entry that contains the URI of the manifest. The VerifyCCTrust method is provided through an ITrustManager interface and is invoked by a CCDM object to verify the trust of the custom code during installation. The OnCC{Event} methods are provided though an IReportProgress interface and are invoked by a CCDM object to report events to the HostCCDM object. The HostCCDM object can then perform host-specific processing or at least loader-specific processing when the loader is shared by multiple host applications.

Figure 4:
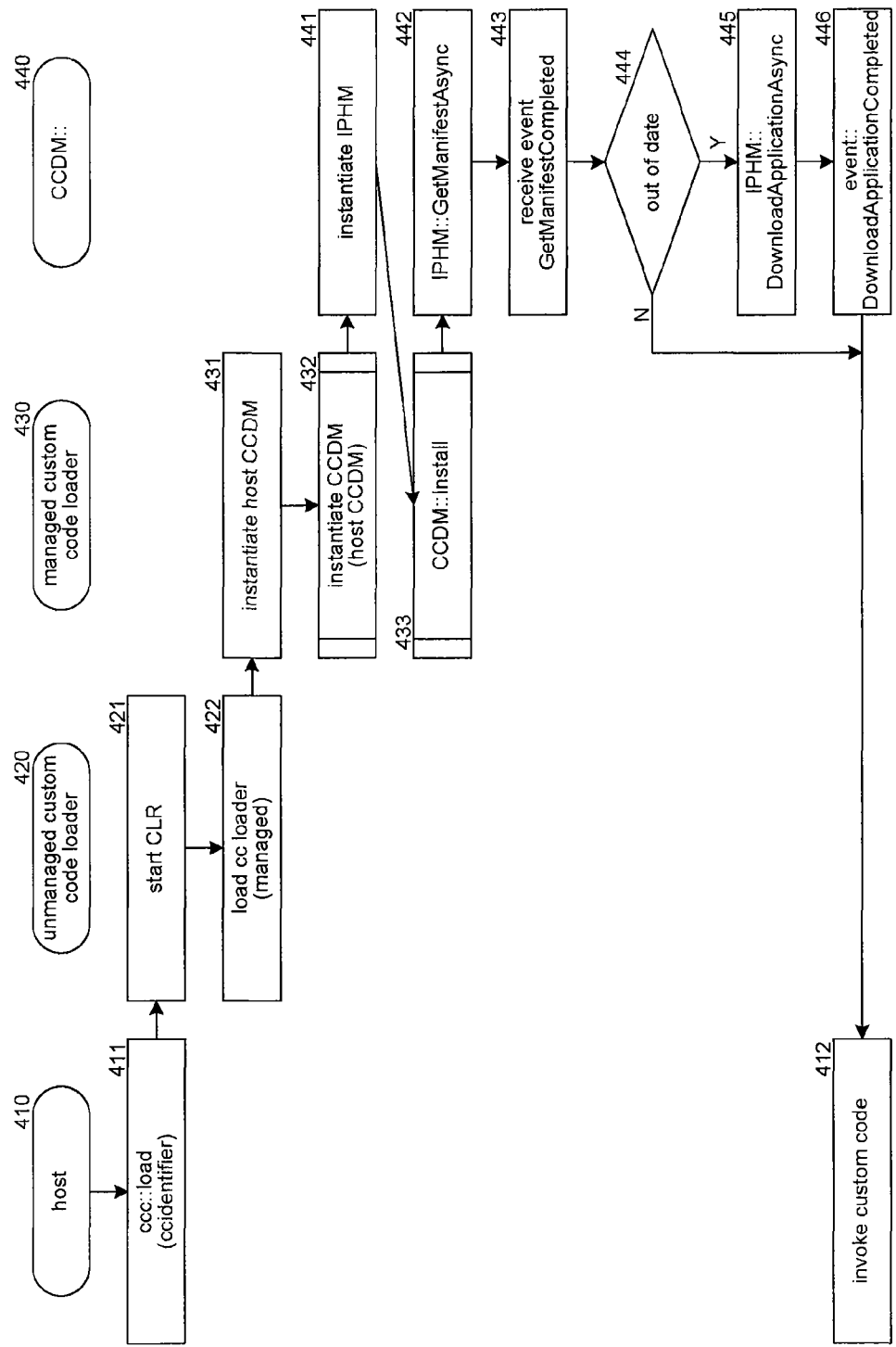
FIG. 4 is a flow diagram that illustrates processing of aspects of the deployment system in one embodiment.

FIG. 4 is a flow diagram that illustrates processing of aspects of the deployment system in one embodiment. In block 411, a host application 410 invokes a load method of an unmanaged custom code loader object, passing an identifier of the manifest of the custom code to be loaded. In block 421, the unmanaged custom code loader object 420 starts the CLR. In block 422, the unmanaged custom code loader object invokes a load method of a managed custom code loader object. In block 431, the managed custom code loader object 430 instantiates a host custom code deployment manager object (hostCCDM). In block 432, the managed custom code loader object instantiates a custom code deployment manager object (CCDM), passing the verify trust and report progress interfaces of the host custom code deployment manager object (hostCCDM). In block 441, the custom code deployment manager object (CCDM) 440 instantiates an in place hosting manager object. In block 433, the managed custom code loader object invokes the install method of the custom code deployment manager object (CCDM). In block 442, the custom code deployment manager object (CCDM) invokes the get manifest method of the in place hosting manager object. In block 443, the custom code deployment manager object (CCDM) receives an event indicating that the download of the manifest has been completed and reports the event to the host custom code deployment manager object (hostCCDM). In decision block 444, if the download cache is out of date (e.g., does not contain a version of the custom code or contains an outdated version of the custom code), then the custom code deployment manager object (CCDM) continues at block 445, else the custom code deployment manager object (CCDM) may invoke a method of the host custom code deployment manager object (hostCCDM) to provide notification that the custom code has been installed and continues at block 412. In block 445, the custom code deployment manager object (CCDM) invokes the download application method of the in place hosting manager object. In block 446, the custom code deployment manager object (CCDM) receives an event indicating that the download of the application is complete and invokes methods of the host custom code deployment manager object (hostCCDM) to report that the download is complete and the custom code has been installed. When control is returned to the host application, the host application in block 412 invokes the custom code.

Figure 5:
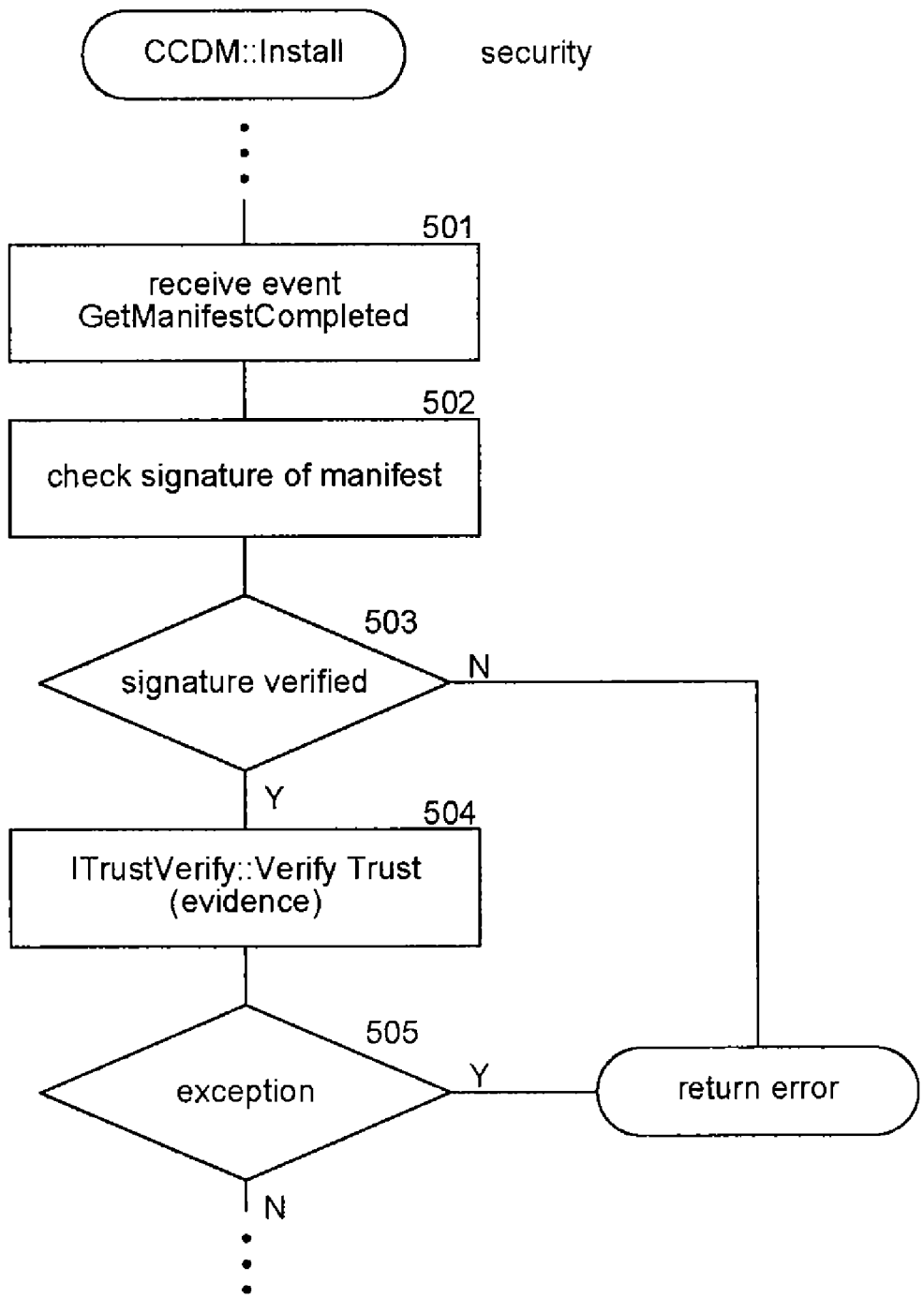
FIG. 5 is a flow diagram that illustrates a verify trust portion of the install method of a custom code deployment manager object (CCDM) of the deployment system in one embodiment.

FIG. 5 is a flow diagram that illustrates a verify trust portion of the install method of a custom code deployment manager object (CCDM) of the deployment system in one embodiment. In block 501, the object receives an event indicating that the manifest has been downloaded. In block 502, the object verifies the signature of the manifest. In decision block 503, if the signature is verified, then the object continues at block 504, else the object returns an error. In block 504, the object invokes a verify trust method of a verify trust interface, passing portions of the manifest to allow the host application an opportunity to verify the trust of the manifest.

In decision block 505, if an exception is raised, then the object returns an error, else the object continues the installation of the custom code.

Figure 6:
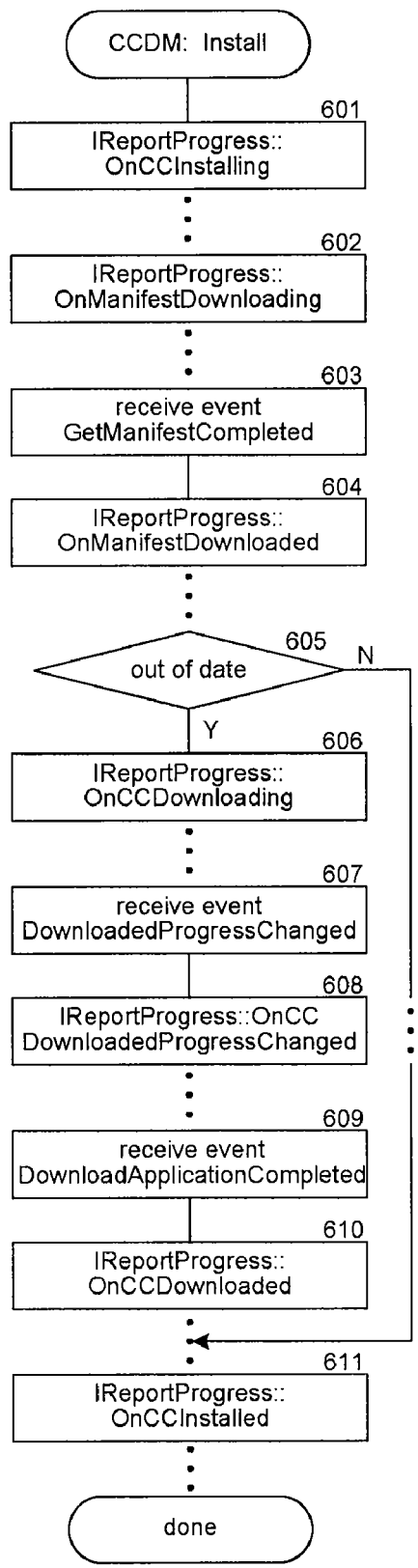
FIG. 6 is a flow diagram that illustrates the reporting of events by the install method of the custom code deployment manager object (CCDM) of the deployment system in one embodiment.

FIG. 6 is a flow diagram that illustrates the reporting of events by the install method of the custom code deployment manager object (CCDM) of the deployment system in one embodiment. The custom code deployment manager object (CCDM) reports the progress of the installation to the host custom code deployment manager object (hostCCDM). In block 601, the object provides notification that the installation of the custom code is in progress. In block 602, the object provides notification that the downloading of the manifest is in progress. In block 603, the object receives an event indicating that the download of the manifest has been completed. In block 604, the object provides notification that the download of the manifest has been completed. In decision block 605, if the cached version of the custom code is out of date based on analysis of the downloaded manifest and what is stored in the cache, then the object continues at block 606, else the object continues at block 611. In block 606, the object provides notification that downloading of the application is in progress. In block 607, the object receives an event indicating that the download of the application is progressing. In block 608, the object provides notification that the progress of the download of the application is changed. In block 609, the object receives an event indicating that the download of the application has completed. In block 610, the object provides notification that the download of the application has completed. In block 611, the object provides notification that the custom code has been installed and then completes.

Figure 7:
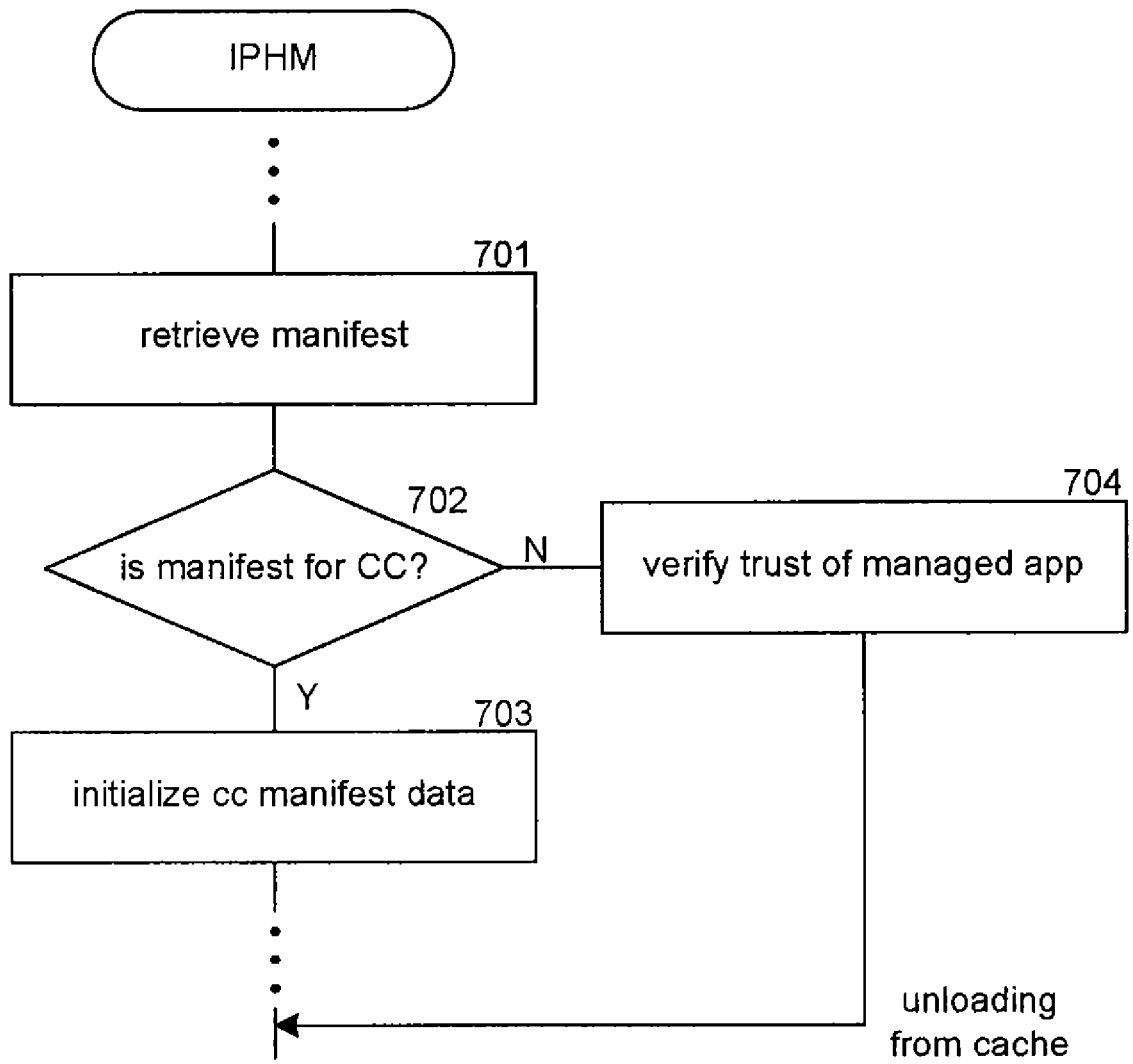
FIG. 7 is a flow diagram that illustrates aspects of an in place hosting manager object that has been modified to accommodate the deployment of custom code in one embodiment.

FIG. 7 is a flow diagram that illustrates aspects of an in place hosting manager object that has been modified to accommodate the deployment of custom code in one embodiment. In block 701, the object retrieves the manifest. In decision block 702, if the manifest is for custom code, then the component continues at block 703, else the component continues at block 704. In block 703, the object initializes the host manifest information that is specific to the custom code. In block 704, the object verifies the trust of the managed application based on the manifest and then continues its processing.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computer system for, upon request of a requestor of a host application, downloading custom code for execution within the host application, the host application for execution within a host process and the custom code for execution as managed code with the host process, the computer system comprising:
a memory storing computer-executable instructions of:
a unmanaged custom code loader that, when requested by the requestor, starts execution of a managed code runtime environment and invokes managed code of the managed code runtime environment to download the custom code;
a managed custom code loader that executes within the managed code runtime environment and when invoked by the unmanaged custom code loader component,
downloads a manifest for the custom code that specifies components of the custom code and includes information describing how the custom code is to be used;
reports to the requestor progress during the download of the manifest so that additional processing can be performed by the requestor when downloading the manifest;
downloads the custom code in accordance with the downloaded manifest;
verifies trust of the custom code by invoking functionality provided by the requestor;
reports to the requestor progress during the download of the custom code so that additional processing can be performed by the requestor when downloading the custom code; and
launches execution of the custom code as managed code executing within the managed code runtime environment within the host process; and
a component that uninstalls the custom code when requested by the requestor; and
a processor that executes the computer-executable instructions stored in the memory.

2. The system of claim 1 wherein the managed custom code loader is an in place hosting manager object.

3. The system of claim 2 wherein the in place hosting manager object is instantiated by a custom code deployment manager object (CCDM) that provides to the in place hosting manager object an interface for verifying trust and for reporting progress.

4. The system of claim 3 wherein the custom code deployment manager object (CCDM) is instantiated by the requestor, which provides the interfaces for verifying trust and for reporting progress.

5. The system of claim 4 wherein the custom code deployment manager object (CCDM) and interfaces for verifying trust and reporting progress are provided by the custom code loader that is invoked by the unmanaged custom code loader host application.

6. The system of claim 4 wherein the custom code deployment manager object (CCDM) and interfaces for verifying trust and reporting progress are provided by the host application.

7. The system of claim 2 wherein the in place hosting manager object does not automatically uninstall custom code.

8. The system of claim 2 wherein the in place hosting manager object is adapted to download managed applications and custom code.

9. The system of claim 1 wherein the managed custom code loaders installs the custom code in a cache so that subsequent downloads of the custom code can be satisfied from the cache.

10. A computer system for downloading custom code for execution within a host application, the host application for execution within a host process and the custom code for execution as managed code within the host process, the computer system comprising:
a memory storing computer-executable instructions of:
a unmanaged custom code loader that
receives from the host application an identification of the custom code, a verify trust interface, and a report progress interface,
starts execution of a common language runtime environment for execution of managed code, and
invokes the managed code for execution within the common language runtime environment to download the custom code;

a managed custom code loader executing as managed code for installing the custom code that
   receives from the unmanaged custom code loader the identification of the custom code, the verify trust interface, and the report progress interface,
   downloads a manifest for the identified custom code, the downloaded manifest specifies components of the custom code and includes information describing how the custom code is to be used,
   reports progress to the host process during the download of the manifest using the report progress interface so that additional processing can be performed by the host process when downloading the manifest,
   downloads the custom code in accordance with the downloaded manifest,
   verifies trust of the custom code using the verify trust interface, and
   reports progress to the host process during the downloading of the custom code using the report progress interface so that additional processing can be performed when downloading the custom code; and
   launches execution of the custom code as managed code within the common language runtime environment to execute within the host process; and
   a component that uninstalls custom code that has been previously installed; and
a processor that executes the computer-executable instructions stored in the memory.

11. The system of claim 10 wherein the managed custom code loader includes a custom code deployment manager object (CCDM).

12. The system of claim 11 wherein the custom code deployment manager object (CCDM) instantiates an in place hosting manager object to download the manifest and the custom code and to report on progress of downloading using events.

13. The system of claim 12 wherein when an event indicates progress in downloading, reporting the progress to the host application using the report progress interface.

14. The system of claim 11 wherein a host custom code deployment manager object (hostCCDM) instantiates the custom code deployment manager object (CCDM), passing the identification of the custom code, the verify trust interface, and the report progress interface.

15. The system of claim 14 wherein the custom code deployment manager object (CCDM) and the host custom code deployment manager object (hostCCDM) are provided by the managed custom code loader.

16. The system of claim 14 wherein the custom code deployment manager object (CCDM) and the host custom code deployment manager object (hostCCDM) are provided by the host application.

17. A method in a computer system of downloading custom code for execution within a host application, the host application for execution within a host process and the custom code for execution as managed code within the host process, the method comprising:
   instantiating within the host process a host custom code deployment manager object (hostCCDM) that provides a verify trust interface and a report progress interface;
   instantiating within the host process a custom code deployment manager object (CCDM) that is provided with an identification of the custom code, the verify trust interface, and the report progress interface; and
   controlling by the custom code deployment manager object (CCDM),
      starting a common language runtime environment for execution of managed code within the host process;
      downloading a manifest for the custom code, the downloaded manifest specifies components for the custom code and includes information describing how the custom code is to be used,
      reporting to the custom code deployment manager object (CCDM) progress of the downloading the manifest during the downloading of the manifest using the report progress interface so that additional processing can be performed by the custom code deployment manager object (CCDM) when downloading the manifest,
      downloading the custom code in accordance with the manifest,
      reporting to the custom code deployment manager object (CCDM) progress of the downloading the custom code during the downloading of the custom code using the report progress interface so that additional processing can be performed by the custom code deployment manager object (CCDM) when downloading the custom code; and
      launching execution of the downloaded custom code as managed code within the common language runtime environment within the host process.

18. The method of claim 17 wherein the host custom code deployment manager object (hostCCDM) and the custom code deployment manager object (CCDM) are instantiated by a loader invoked by the host application.

19. The method of claim 17 wherein the host custom code deployment manager object (hostCCDM) and the custom code deployment manager object (CCDM) are instantiated by the host application.

* * * * *